W. FINLAY.
Grain-Drill.

No. 27,789. Patented Apr 10, 1860

WITNESSES:

INVENTOR:

UNITED STATES PATENT OFFICE.

WILLIAM FINLAY, OF SCHOOLCRAFT, MICHIGAN.

IMPROVEMENT IN SEEDING-HARROWS.

Specification forming part of Letters Patent No. 27,789, dated April 10, 1860.

*To all whom it may concern:*

Be it known that I, WILLIAM FINLAY, of Schoolcraft, in the county of Kalamazoo and State of Michigan, have invented a new and useful Improvement in Combined Seed-Sowing and Harrowing Machines; and I do hereby declare that the following is a full, clear, and exact description thereof, reference being had to the accompanying drawings, forming a part of this specification, in which—

Figure 1:
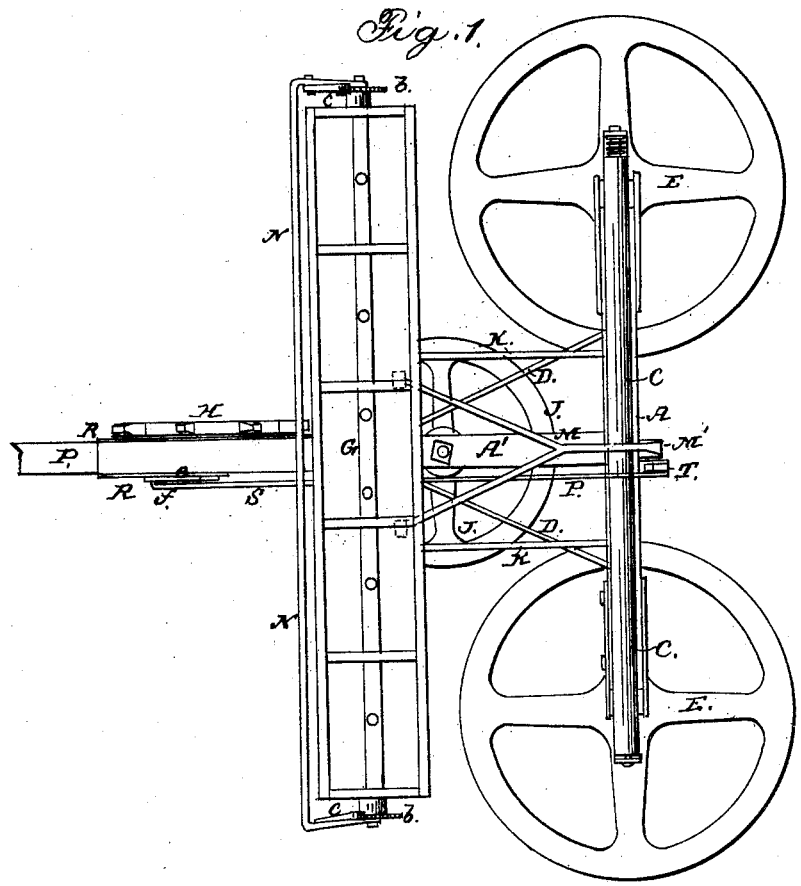
Figure 2:
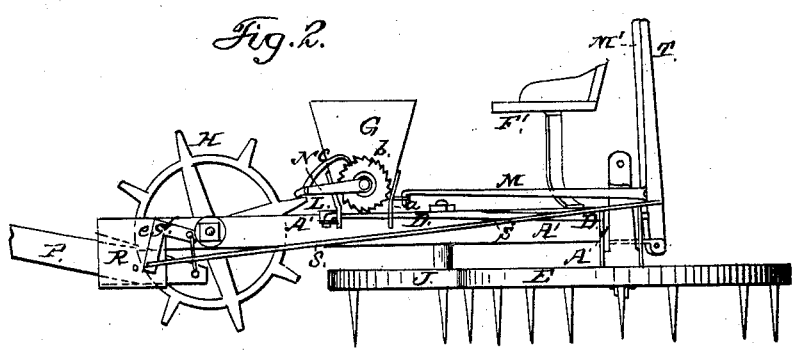

Figure 1 represents a plan view of a harrow and seeding-machine in which my improved mode of operating the hopper so as to throw the same out of gear from the seed-distributing device and thus stop the discharge at the option of the driver is clearly shown. Fig. 2 is a vertical elevation of Fig. 1, showing clearly the manner of hanging the forward drag or traction wheel, whereby the same will accommodate itself to the uneven surface of the ground and the front end of the machine may be raised or depressed.

Similar letters of reference indicate corresponding parts in both figures.

This invention is an improvement on the United States patent of M. S. Root, dated October 19, 1858, for a combined seeding and harrowing machine, whereby the hopper for distributing the seed may be thrown out of gear with the traction-wheel by a simple movement of a lever by the driver. The scattering of seed may thus be regulated at the option of the driver, either for turning the machine around or when going straight ahead, and the dropping of the seed can be instantly stopped while the machine is in motion.

My invention also has for its object the raising or depressing of the forward end of the machine, which is also to be controlled by the driver from his seat. This will also allow the front traction-wheel to accommodate itself to the uneven surface of the ground.

My invention consists in a certain novel combination of parts, hereinafter described, for effecting the above objects.

To enable those skilled in the art to fully understand my invention, I will proceed to describe its construction and operation.

In the drawings, A is the cross-beam, braced to the longitudinal beam A' by bars D D. E E are the harrows, hinged and pivoted to each end of the cross-beam A, so that they can be turned up and used as wheels by removing the bar C. F is the driver's seat. G is the hopper, extending across the beam A'. H is the toothed traction-wheel. I is the draft-pole, and J a supplemental revolving harrow, supported behind the hopper G and by the beam A'. These parts are all in common with the machine of Root above referred to.

To such a machine I apply two fixed bars, K K, and secure them to the cross-beam A and to a bar, L, and on these bars I rest the hopper G and secure it down to the bars by metal straps $a\ a$, so that it may receive a longitudinal movement. To the back of the hopper or seed-box G, I attach a bifurcated rod, M, which works in suitable guides, and is operated by a lever, M', placed just behind the driver's seat F.

The seed-roller, which is placed in the bottom of hopper G, is turned by a ratchet-wheel, $b$, pawl $c$, and a vibrating arm, N, to which the pawl is attached, as described in Root's specification. The vibrating arm N is operated by the projecting teeth of the traction-wheel H as the machine proceeds along over the ground. Now, by pressing the lever M' back the hopper, with its vibrating arm N, will recede from the traction-wheel, and the arm will cease its motion, and consequently the seed will not drop. The machine with the hopper in this condition may be used as a harrow only and drawn about from place to place without wasting the seed. To again bring the seeding device into operation it is only necessary to draw the lever M' forward, when the traction-wheel will again operate the vibrating-arm.

In order that the driver may be able to raise or depress the front end of the machine at will, the draft-pole P is pivoted near its rear end to the sides of a box, R, which box is secured to the forward end of the beam A', and secures the pole from moving laterally, but allows the parts to rock vertically on the pivot-joint. The rear end of the draft-pole is connected to a right-angular arm, $e$, which is pivoted at $f$ to the beam A', so as to rock freely. S is a rod connecting with the arm $e$ and leading back to a lever, T, in rear of the driver's seat. Now, by pressing this lever T back the front end of the machine will be elevated and the traction-wheel will be liberated from the ground. This manner of hanging the front end of the machine to the draft-pole will admit the traction-wheel to accommodate itself to any unevenness in the surface of the ground, and thus keep it rotating when it is desirable to sow the seed.

These parts hereinabove described as my invention and improvement are exceedingly simple and efficient in their operation, and greatly add to the value of the Root machine.

Having thus described my invention and improvement, what I claim, and desire to secure by Letters Patent, is—

The wheel H, arms N, bars K K, and connecting-rod M, with lever M', in combination with the seed-hopper G, when the same are arranged and combined with the front adjustment of the revolving harrow-frame herein set forth, for the purposes specified.

WILLIAM FINLAY.

Witnesses:
E. H. LOTHROP,
WM. F. ARNOLD.